US012807158B2

(12) United States Patent
Grundmann

(10) Patent No.: US 12,807,158 B2
(45) Date of Patent: Nov. 24, 2026

(54) METHOD FOR PERFORMING AN AUTOMATIC LANE CHANGE BY A MOTOR VEHICLE

(71) Applicant: Robert Bosch GmbH, Stuttgart (DE)

(72) Inventor: Thilo Grundmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 18/962,999

(22) Filed: Nov. 27, 2024

(65) Prior Publication Data

US 2025/0187602 A1 Jun. 12, 2025

(30) Foreign Application Priority Data

Dec. 12, 2023 (DE) ..................... 10 2023 212 523.4

(51) Int. Cl.
*B60W 30/18* (2012.01)
*B60W 50/10* (2012.01)
*B60W 50/16* (2020.01)

(52) U.S. Cl.
CPC ...... *B60W 30/18163* (2013.01); *B60W 50/10* (2013.01); *B60W 50/16* (2013.01); *B60W 2540/225* (2020.02)

(58) Field of Classification Search
CPC ........... B60W 30/18163; B60W 50/10; B60W 50/16; B60W 2540/225; B60W 50/08; B60W 2420/403; B60W 2540/215
See application file for complete search history.

(56) References Cited

U.S. PATENT DOCUMENTS

2018/0373250 A1* 12/2018 Nakamura ........... G06V 20/597
2019/0143982 A1* 5/2019 Hashimoto ........... B60W 30/12 701/23
2020/0207355 A1* 7/2020 Ishioka .................. G08G 1/167

FOREIGN PATENT DOCUMENTS

CN 116161036 A * 5/2023 ...... B60W 30/18163
WO WO-2020230301 A1 * 11/2020 ........... G06V 20/588

* cited by examiner

*Primary Examiner* — Ig T An
(74) *Attorney, Agent, or Firm* — Maginot, Moore & Beck LLP

(57) ABSTRACT

A method for the automatic lane change of a motor vehicle from a first lane into an adjacent second lane of a roadway with at least two lanes. According to the method, the motor vehicle pulls into the first lane in a semi-automated manner. When pulling into the first lane, a driver of the motor vehicle does not touch a manually operated steering wheel of the motor vehicle for adjusting the direction of travel (FR) of the motor vehicle. In addition, while pulling into the first lane in a semi-automated manner, the motor vehicle automatically executes the suggested lane change from the first lane to the second lane after the driver has confirmed the suggestion to change lanes. According to the disclosure, the driver confirms the suggestion by touching the manually operated steering wheel at least temporarily.

9 Claims, 2 Drawing Sheets

METHOD FOR PERFORMING AN AUTOMATIC LANE CHANGE BY A MOTOR VEHICLE

This application claims priority under 35 U.S.C. § 119 to application no. DE 10 2023 212 523.4, filed on Dec. 12, 2023 in Germany, the disclosure of which is incorporated herein by reference in its entirety.

The disclosure relates to a method for carrying out an automatic lane change of a motor vehicle from a first lane into an adjacent second lane of a roadway with at least two lanes. The disclosure also relates to a control device which is configured/programmed to carry out this method. Finally, the disclosure relates to a motor vehicle with such a control device.

BACKGROUND

In the case of semi-automated driving according to so-called "Level 2", confirmation by the driver is usually required for an assisted lane change, to ensure that a lane change suggested by the vehicle should actually be carried out by the motor vehicle.

In conventional motor vehicles configured for semi-automated driving in accordance with "Level 2", such confirmation typically takes place through the driver actuating the turn signal or actively moving the manually operated steering wheel.

However, such a confirmation proves to be comparatively inconvenient if the motor vehicle independently follows the lane it is currently in before the suggested lane change, without the driver touching or even operating the manually operated steering wheel. Pulling into a lane without the driver touching a manually operated steering wheel is known as "hands-free in-lane driving".

SUMMARY

The task of the present disclosure is to provide an improved method for executing a lane change when semi-automated pulling into a roadway with at least two lanes in the sense of the "hands-free in-lane driving" explained above by means of.

This object is achieved by the subject matter of the disclosure. Preferred embodiments are the subject matter of the disclosure.

The basic idea of the disclosure is therefore to carry out an automatic lane change of a semi-automated driving motor vehicle from a first lane into a second lane arranged next to the first lane with the help of a touch sensor provided on the manually operated steering wheel of the motor vehicle, which can detect contact between the manually operated steering wheel and the driver. A touch sensor of this kind, which may be designed as a capacitive touch sensor in particular, is often already installed as standard in a motor vehicle set up for L2 operation.

According to the first aspect of the disclosure, it is therefore proposed that the driver's touch of the manually operated steering wheel—or another manually operated control device—be used for confirmation of a lane change suggested by the motor vehicle during semi-automated driving. This eliminates the need for the usual procedure of turning the manually operated steering wheel to the left or right and operating the turn signal, each time to confirm to the motor vehicle that it should change lanes. In this way, the semi-automatic lane change is simplified for the driver, increasing comfort.

According to a second aspect of the disclosure, based on the concept explained above, it is proposed that a lane change be requested by touching the manually operated steering wheel—or another manually operable control device—during "hands-free in-lane driving".

Preferably, the desired direction of the lane change can be selected by manually operating a manually operated steering wheel after touching the same. This considerably simplifies the semi-automatic lane change for the driver and thus significantly improves driving comfort when changing lanes.

Particular preference can be given to selecting the desired direction of the lane change by looking in the direction of the desired lane change, in particular in a left or right side mirror of the motor vehicle, after touching the manually operated steering wheel. In this way, too, the semi-automatic lane change is considerably simplified for the driver and thus the driving comfort when changing lanes is significantly improved.

In accordance with the above concept, the method according to the disclosure serves, in accordance with a first aspect of the disclosure, to carry out an automatic lane change of a motor vehicle from a first lane into an adjacent second lane of a roadway with at least two lanes.

The method according to the first aspect can be carried out by a control device provided in the motor vehicle. According to the first aspect of the disclosure, the motor vehicle pulls into a semi-automated manner in the first lane. While pulling into the first lane, a driver of the motor vehicle does not touch a manually operated steering wheel provided in the motor vehicle for setting and changing the direction of travel in the motor vehicle—or another manually operable control device. According to the method, the motor vehicle automatically performs a suggested lane change into the second lane when the vehicle pulls into the first lane in a semi-automated manner, if and as soon as the driver confirms the suggestion to change lanes. According to the disclosure, the driver confirms the suggestion by at least temporarily touching the manually operated steering wheel, preferably with one hand or with both hands.

It is therefore practical for the motor vehicle to wait for a predetermined period of time, preferably measured from the time the motor vehicle notifies the driver of the suggestion, and to check whether the driver confirms the suggestion to change lanes. If this check shows that the driver has not touched the manually operated steering wheel for the predetermined period of time, the motor vehicle or the motor vehicle interprets this as a rejection of the suggestion to change lanes and no lane change is carried out. If it is touched, however, the motor vehicle independently performs the suggested lane change. The driver's touch on the manually operated steering wheel required for this can be detected with the help of a touch sensor present on the manually operated steering wheel, which transmits sensor data to the control device according to the disclosure for further processing or evaluation.

According to an advantageous further development of the method according to the disclosure according to the first aspect, the motor vehicle suggests the lane change when it is detected by the motor vehicle, in particular by means of an optical sensor and by means of image processing, that the driver is looking into a side mirror of the motor vehicle facing the second lane. This helps to relieve the driver of some of the work of controlling the motor vehicle and improves driving comfort.

According to a further advantageous further training, the suggestion to change lanes is made to the driver by issuing a signal in the vehicle interior. This signal can in particular be an optical and/or acoustic and/or haptic signal. Suitable output devices for visual, acoustic and haptic signal output are usually available as standard in a motor vehicle, so that these devices can be used. The signal output is also used to start the measurement of a predetermined period of time during which the motor vehicle waits for confirmation of the suggestion by touching the manually operated steering wheel. If the manually operated steering wheel is not touched within this period, this can be interpreted as a rejection of the driver's suggestion to change lanes. In this case, no lane change is carried out and the procedure is terminated prematurely.

In a preferred embodiment of the method according to the first aspect, the confirmation of the suggestion by the driver of the motor vehicle is only accepted as having taken place if, in addition to the driver touching the manually operated steering wheel, the driver also turns it in a direction that corresponds to a change in the direction of travel of the motor vehicle towards the second lane. This embodiment reduces the risk of an unintentional lane change, in particular due to the driver accidentally touching the manually operated steering wheel.

Likewise following the disclosure above, the method according to the disclosure, according to a second aspect of the disclosure, is used to carry out an automatic lane change of a motor vehicle from a first lane into an adjacent second lane of a roadway with at least two lanes. The method according to the second aspect, as defined in the disclosure, can also be carried out by a control device provided in the motor vehicle. In the method according to the second aspect of the disclosure, the motor vehicle also pulls into the first lane in a semi-automated manner. While pulling into the first lane, a driver of the motor vehicle does not touch a manually operated steering wheel—or another manually operated control device—of the motor vehicle for adjusting the direction of travel of the motor vehicle. In contrast to the procedure according to the first aspect, however, a lane change desired by the driver from the first lane into the second lane is triggered by at least temporarily touching the manually operated steering wheel, not as confirmed in the first aspect, but only initiated. Here, too, touching the manually operated steering wheel can be detected with the help of a touch sensor located on the manually operated steering wheel, which transmits sensor data to the control device according to the disclosure for further processing or evaluation.

In a preferred embodiment of the method according to the disclosure according to the first or second aspect, the triggering of the lane change by the driver of the motor vehicle is only accepted if, in addition to the driver touching the manually operated steering wheel, the driver adjusts it along a direction of rotation that corresponds to a change in the direction of travel of the motor vehicle towards the second lane. This embodiment also reduces the risk of an unintentional lane change, in particular due to the driver of the motor vehicle accidentally touching the manually operated steering wheel.

In a further preferred embodiment of the method according to the disclosure in accordance with the first or second aspect, the triggering of the lane change by the driver of the motor vehicle is only accepted if, in addition to the driver touching the manually operated steering wheel, a change in the line of vision in the direction of the target lane is detected. This embodiment also reduces the risk of an unintentional lane change, in particular due to the driver of the motor vehicle accidentally touching the manually operated steering wheel.

According to an advantageous further development of the method according to the disclosure according to the first or second aspect, the automatic lane change is aborted if, during the lane change, the driver adjusts the manually operated steering wheel in a direction of rotation which corresponds to a change in the direction of travel of the motor vehicle away from the second lane. This further development increases driving safety when changing lanes, particularly in the event of critical incidents occurring during the lane change process.

According to another advantageous further development of the method according to the disclosure according to the first or second aspect, the automatic lane change can be aborted if the driver interrupts or stops touching the manually operated steering wheel during the lane change, in particular if they remove their hands from the manually operated steering wheel again. This further development also increases driving safety when changing lanes, particularly in the event of critical incidents occurring during the lane change process.

The disclosure also relates to a control device for a motor vehicle. The control device according to the disclosure is designed and programmed for carrying out the method according to the disclosure presented above according to any one of the preceding disclosures, so that the advantages of the method according to the disclosure explained above are transferred to the control device according to the disclosure.

The disclosure also relates to a motor vehicle. The motor vehicle according to the disclosure comprises a steering device for setting a current direction of travel of the motor vehicle. In addition, the motor vehicle comprises a manually operated steering wheel—or another manually operated control device—for controlling the steering device by a driver of the motor vehicle. In this case, the manually operated steering wheel has at least one touch sensor for detecting whether the driver is touching the manually operated steering wheel, preferably with one or both hands. Furthermore, the motor vehicle comprises a control device, as presented previously and thus according to the disclosure, which interacts with the touch sensor of the manually operated steering wheel, so that the advantages of the method according to the disclosure, as explained above, are transferred to the motor vehicle according to the disclosure. In the course of semi-automated driving of the motor vehicle, the control device can control the steering device of the motor vehicle—in addition to the manually operated steering wheel—and thus change the direction of travel of the motor vehicle. U+

The disclosure also relates to a computer program product that contains commands which, when the computer program product is executed by a computer system and/or by a control device according to the disclosure, cause the device to execute the method according to the disclosure. The advantages of the method according to the disclosure as explained above therefore apply to the computer program product according to the disclosure.

Finally, the disclosure relates to a data carrier that contains commands which, when executed by a computer system and/or by the control device according to the disclosure, cause it to carry out the method according to the disclosure.

Further important features and advantages of the disclosure will emerge from the disclosure, from the drawings and from the associated description of the figures with reference to the drawings.

It goes without saying that the aforementioned features and the features yet to be explained in the following can be used not only in the respectively specified combination, but also in other combinations or on their own, without leaving the scope of the present disclosure.

BRIEF DESCRIPTION OF THE DRAWINGS

Preferred exemplary embodiments of the disclosure are shown in the drawings and will be explained in more detail in the following description, wherein same reference numerals refer to same or similar or functionally same components.

The figures schematically show the following.

DETAILED DESCRIPTION

Figure 1:
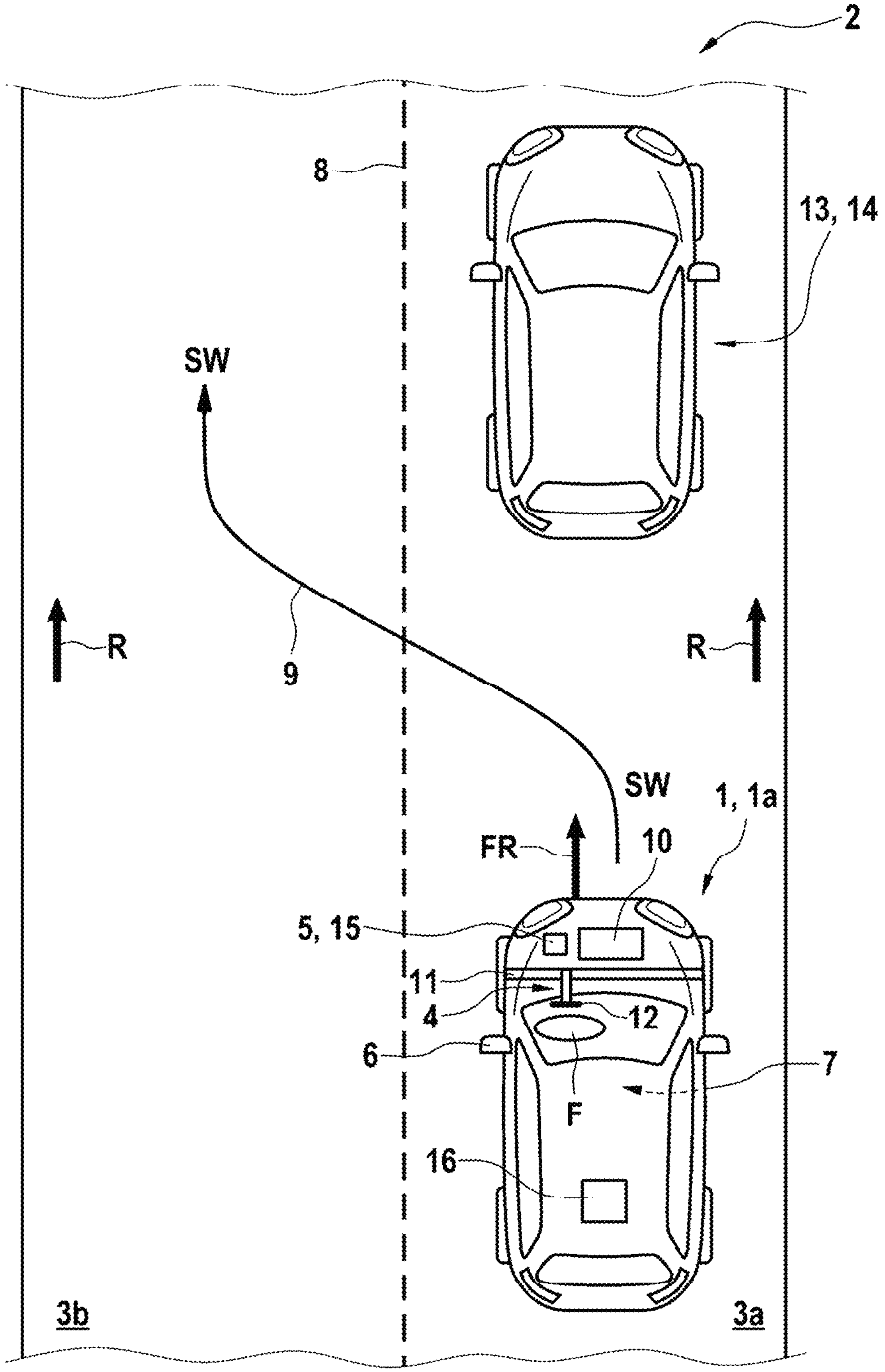
FIG. 1 exemplifies, in a greatly simplified form, a two-lane roadway onto which a motor vehicle according to the disclosure is pulling while the method according to the disclosure is being carried out.

FIG. 1 shows, as an example of the process according to the disclosure, a two-lane roadway 2 in a very simplified form, in a view from above onto the roadway 2. The roadway 2 comprises a first lane 3*a* that can be driven along in the direction of R of vehicles and a second lane 3*b* that can also be driven along in the direction of travel R and is arranged to the left of the first lane 3*a*. In the example of FIG. 1, the two lanes 3*a*, 3*b* are separated from each other by a dashed lane 8.

The method according to the disclosure is used to carry out an automatic lane change of a motor vehicle 1, designated as ego vehicle 1*a* in FIG. 1 and according to the disclosure, from the first lane 3*a* into the adjacent second lane 3*b*. Such a lane change, which has yet to be carried out—indicated and marked in FIG. 1 by an arrow with the reference numeral 9—may be necessary due to a road user 13 travelling ahead at a lower speed—in the example of FIG. 1, this is also a motor vehicle 14—may be necessary if the motor vehicle 1 is to avoid braking or the motor vehicle 1 is to avoid colliding with the motor vehicle 14 in front.

In order to carry out the method according to the disclosure, the motor vehicle 1 must pull into the first lane 3*a* in front of the upcoming lane change SW in a semi-automated manner, as shown in FIG. 1. The motor vehicle according to the disclosure (1) comprises a steering device (11) for setting a current direction of travel FR of the motor vehicle (1), which, in the snapshot shown in FIG. 1, is identical to the direction R of the roadway (2).

In addition, the motor vehicle 1 has a manually operated steering wheel 4 for controlling the steering device 11 by a driver F of the motor vehicle 1. The manually operated steering wheel 4 in turn comprises a touch sensor 12, by means of which it can be detected whether the driver F is touching the manually operated steering wheel 4, in particular with one or both of his hands.

Furthermore, the motor vehicle 1 comprises a control device 10 that interacts with the touch sensor 12 of the manually operated steering wheel 4 and is connected to the touch sensor 12 for this purpose to transmit data. The touch sensor 12 can transmit information to the control device 10 indicating whether or not the driver F is currently touching the manually operated steering wheel 4. Furthermore, the control device 10 can control the steering device 11 of the motor vehicle 1—in addition to the manually operated steering wheel 4—in the course of a semi-automated driving operation of the motor vehicle 1 and consequently change the direction of travel FR of the motor vehicle 1. The control device 10 according to the disclosure is also designed and programmed to carry out the method according to the disclosure.

In the following, the method according to the disclosure will be explained by way of example based on the representation of FIG. 1 in conjunction with the flow diagram of FIG. 2, based on the first aspect of the present disclosure.

In order to carry out the method, it is necessary that the driver F of the motor vehicle 1 does not touch the manually operated steering wheel 4 of the motor vehicle 1 for setting the direction of travel FR of the motor vehicle 1, while the motor vehicle 1, i.e. the ego vehicle 1*a*, is driving in the first lane 3*a* in a semi-automated manner.

Figure 2:
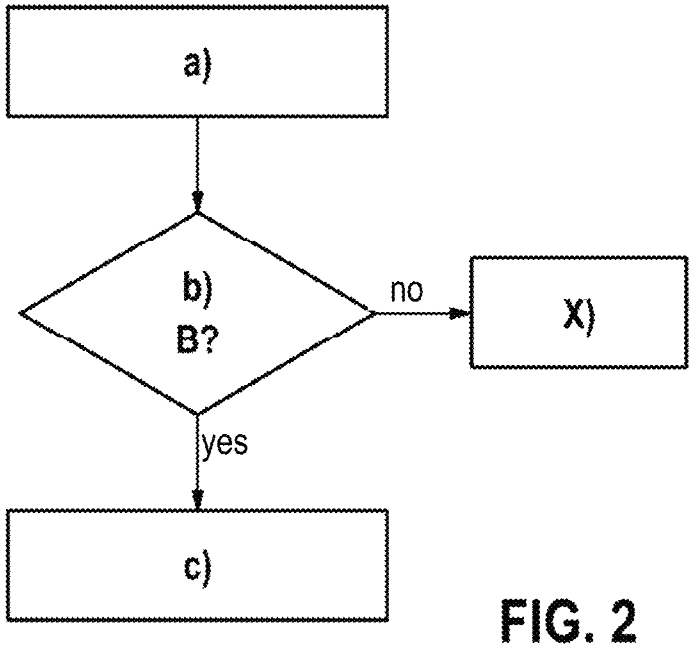
FIG. 2 shows a flow chart illustrating the method according to the first aspect.

In a first measure a) of the method according to the first aspect of the disclosure according to FIG. 2, the driver of the motor vehicle 1 or the control device 10 is suggested to change from the first lane 3*a* to the second lane 3*b*. One trigger for this suggestion may be, for example, the motor vehicle 14 travelling ahead at a lower speed than the ego vehicle 1*a* in the first lane 3*a*, which is detected by a vehicle assistance system of the motor vehicle 1, which is not shown in more detail in FIG. 1. Alternatively, however, it is also conceivable that the driver F is given the aforementioned suggestion to change the first lane 3*a* that is currently being driven in if the motor vehicle 1, for example by means of an optical sensor 5 installed in the motor vehicle 1, which is connected in an analogous manner to the touch sensor 12, is connected to the control device 10 in an analogous manner for transmitting data, that the driver F is looking into a side mirror 6 of the motor vehicle 1 facing the second lane 3*b*—in the example of FIG. 2, this is the left side mirror. In this case, the optical sensor 5 can be formed by a camera 15 whose field of vision in the vehicle interior 7 is directed towards the face of the driver F.

The suggestion to change lanes can be brought to the attention of the driver F by means of a signal generated by the motor vehicle 1 in the vehicle interior 7. For this purpose, an output unit 16 that can be controlled by the control device 10 can be provided in the vehicle interior 7. The said signal can be, for example, a visual, acoustic or even haptic signal, which means that the output unit 16 is designed to output a visual, acoustic or haptic signal.

In a second measure b), the motor vehicle 1 or the control device 10 waits for a confirmation B of the proposal. To do this, control device 10 uses touch sensor 12 to check whether driver F has touched manually operated steering wheel 4 in response to the signal output by output unit 16. This check can be carried out for a predetermined period of time, for example measured from the signal output described above. If it is determined that the manually operated steering wheel 4 has not been touched by the driver F for confirmation B of the suggestion after the predetermined time period, the motor vehicle 1 or the control device 10 interprets this as a rejection of the suggestion to change lanes SW. In this case, no lane change SW is carried out and the procedure is ended in a final measure x). In the course of the final measure x), an appropriate output signal indicating the completion of the procedure can be issued via output unit 16.

If, on the other hand, the touch sensor 12 detects contact with the manually operated steering wheel 4 during the predetermined period of time and transmits this to the control device 10, the motor vehicle 1 independently performs a lane change SW from the first lane 3*a* to the second lane 3*b* in a semi-automated operation in a third measure c).

To change lanes, the manually operated steering wheel 4 does not need to be turned by the driver F.

In a further variant of the method according to the first aspect, the confirmation of the suggestion by the driver F of the motor vehicle 1 is only accepted as having taken place if, in addition to touching the manually operated steering wheel 4 by the driver F, it is adjusted—preferably also by the driver F—along a direction of rotation which corresponds to a change in the direction of travel FR of the motor vehicle 1 towards the second lane 3*b*.

Once the motor vehicle 1 has changed from the first lane 3*a* to the second lane 3*b*, the method according to the disclosure is complete.

Figure 3:
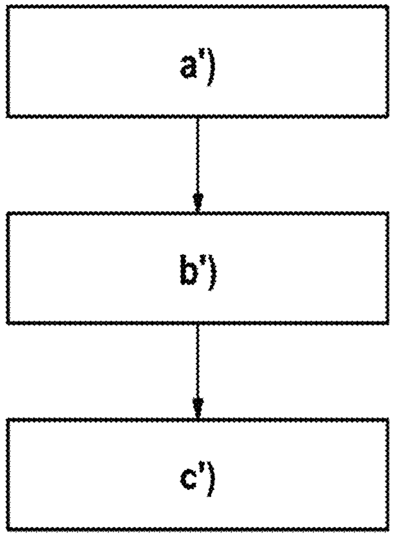
FIG. 3 shows a flow chart illustrating the method according to the second aspect.

FIG. 3, based on the representation of FIG. 2, also shows a flow diagram, which is used below to explain the method according to the disclosure with reference to the second aspect of the disclosure.

Analogous to the example in FIG. 2, in order to carry out the method according to the second aspect, it is also necessary that the driver F of the motor vehicle 1 does not touch the manually operated steering wheel 4 of the motor vehicle 1 to adjust the direction of travel FR of the motor vehicle 1, while the motor vehicle 1 is driving in a semi-automated manner along the first lane 3*a* according to a first measure a' of the method.

In contrast to the example in FIG. 2, in the example in FIG. 3, while pulling into the first lane 3*a*, a lane change LC from the first lane 3*a* to the second lane 3*b*, desired by the driver D, is not confirmed by touching the manually operated steering wheel 4, as in the example in FIG. 2, but is only triggered by this action in the second measure b'). Touching the manually operated steering wheel 4, preferably with one or both of the driver's hands F, is detected by the touch sensor 12 in an analogous way to that shown in FIG. 2, for example, and transmitted to the control device 10. In a third measure c'), in response to the lane change request triggered by the driver F, the control device 10 independently carries out a lane change SC from the first lane 3*a* to the second lane 3*b* in an analogous manner to the example in FIG. 2. Again, to change lanes, the manually operated steering wheel 4 does not need to be turned by the driver F.

In the respective further training of both the example of FIG. 2 and FIG. 3, it may be provided that the automatic lane change (SW) is aborted by motor vehicle 1 or by control device 10 if the driver F interrupts or ends contact with the manually operated steering wheel 4 during the lane change (SW) and, in particular, removes his hands from the manually operated steering wheel 4.

In another respective further training of both the example of FIG. 2 and FIG. 3, it may be provided that the motor vehicle 1 or the control device 10 prematurely aborts the automatic lane change SW if, during the lane change, the driver F manually adjusts the manually operated steering wheel 4 along a direction of rotation which corresponds to a change in the direction of travel FR of the motor vehicle 1 away from the second lane 3*b*. It is understood that, for this purpose, a data-transmitting connection must be present between a sensor (not shown in the figures) that detects a rotational movement of the manually operated steering wheel and the control device 10, so that such a rotational movement of the manually operated steering wheel 4 can be brought to the attention of the control device 10.

What is claimed is:

1. A method for performing an automatic lane change of a motor vehicle from a first lane into an adjacent second lane of a roadway with at least two lanes, comprising:

driving the motor vehicle in the first lane in a semi-automated manner, wherein a driver of the motor vehicle does not touch a manually operated steering wheel of the motor vehicle in a manner which adjusts a direction of travel of the motor vehicle;

suggesting, with the motor vehicle, the automatic lane change from the first lane into the adjacent second lane;

confirming the suggestion to change from the first lane into the adjacent second lane, by the driver touching the manually operated steering wheel of the motor vehicle at least temporarily; and automatically, with the motor vehicle, changing from the first lane into the adjacent second lane automatically in response to the confirmation; and aborting the automatic lane change in response to the driver adjusting the manually operated steering wheel in a first direction of rotation which corresponds to a change in the direction of travel of the motor vehicle away from the adjacent second lane, wherein the confirming the suggestion by the driver of the motor vehicle is only accepted as having taken place when, in addition to the driver touching the manually operated steering wheel at least temporarily, the manually operated steering wheel is adjusted in a second direction of rotation which corresponds to a change in the direction of travel of the motor vehicle toward the adjacent second lane.

2. The method according to claim 1, wherein:

the motor vehicle suggests the automatic lane change in response to the motor vehicle recognizing, using an optical sensor, that the driver is looking into a side mirror of the motor vehicle facing the adjacent second lane.

3. The method according to claim 1, wherein:

the suggesting, with the motor vehicle, the automatic lane change is made by a visual and/or acoustic and/or haptic signal generated by the motor vehicle in its interior.

4. The method according to claim 1, wherein:

the confirming the suggestion by the driver of the motor vehicle is only accepted as having taken place when, in addition to the driver touching the manually operated steering wheel at least temporarily and adjusting the manually operated steering wheel in the second direction of rotation, a change in a line of vision of the driver in the direction of the adjacent second lane is detected using an optical sensor.

5. A method for an automatic lane change of a motor vehicle from a first lane into an adjacent second lane of a roadway with at least two lanes, comprising:

driving the motor vehicle in the first lane in a semi-automated manner, wherein a driver of the motor vehicle does not touch with the drivers hands of the driver a manually operated steering wheel of the motor vehicle in a manner which adjusts a direction of travel of the motor vehicle;

triggering the automatic lane change of the motor vehicle from the first lane into the adjacent second lane by the driver at least temporarily touching the manually operated steering wheel with at least one hand; and changing from the first lane into the adjacent second lane automatically with the motor vehicle in response to the triggering; and aborting the automatic lane change in response to the driver removing the at least one hand from the manually operated steering wheel during the automatic lane change or stopping touching the manually operated steering wheel altogether, wherein the triggering the automatic lane change is accepted only when, in addition to touching the manually operated steering wheel, the driver adjusts the manually operated steering wheel in a direction of rotation that corresponds to a change in a current direction of travel of the motor vehicle toward the adjacent second lane, and wherein the adjustment of the manually operated steering wheel is insufficient to manually perform the automatic lane change.

6. A control device for a motor vehicle, wherein the control device is configured/programmed to perform the method according to claim 1.

7. A motor vehicle, comprising:

a steering device configured to set a current direction of travel of the motor vehicle;

a manually operated steering wheel configured to control the steering device by a driver of the motor vehicle, wherein the manually operated steering wheel has a touch sensor configured to detect the driver touching the manually operated steering wheel with at least one hand; and a control device operably connected to the touch sensor of the manually operated steering wheel and configured to control the steering device during at least a semi-automated driving of the motor vehicle thus allowing the direction of travel of the motor vehicle to be adjusted, wherein the control device is configured/programmed to perform the method according to claim 1.

8. The method according to claim 1, wherein a computer program product comprises commands which, when the computer program product is executed by a control device, cause the control device to carry out the method.

9. A non-transitory data carrier which contains commands that, when executed by a computer system, causes the computer system to carry out the method according to claim 1.

* * * * *